Figures 1, 2:
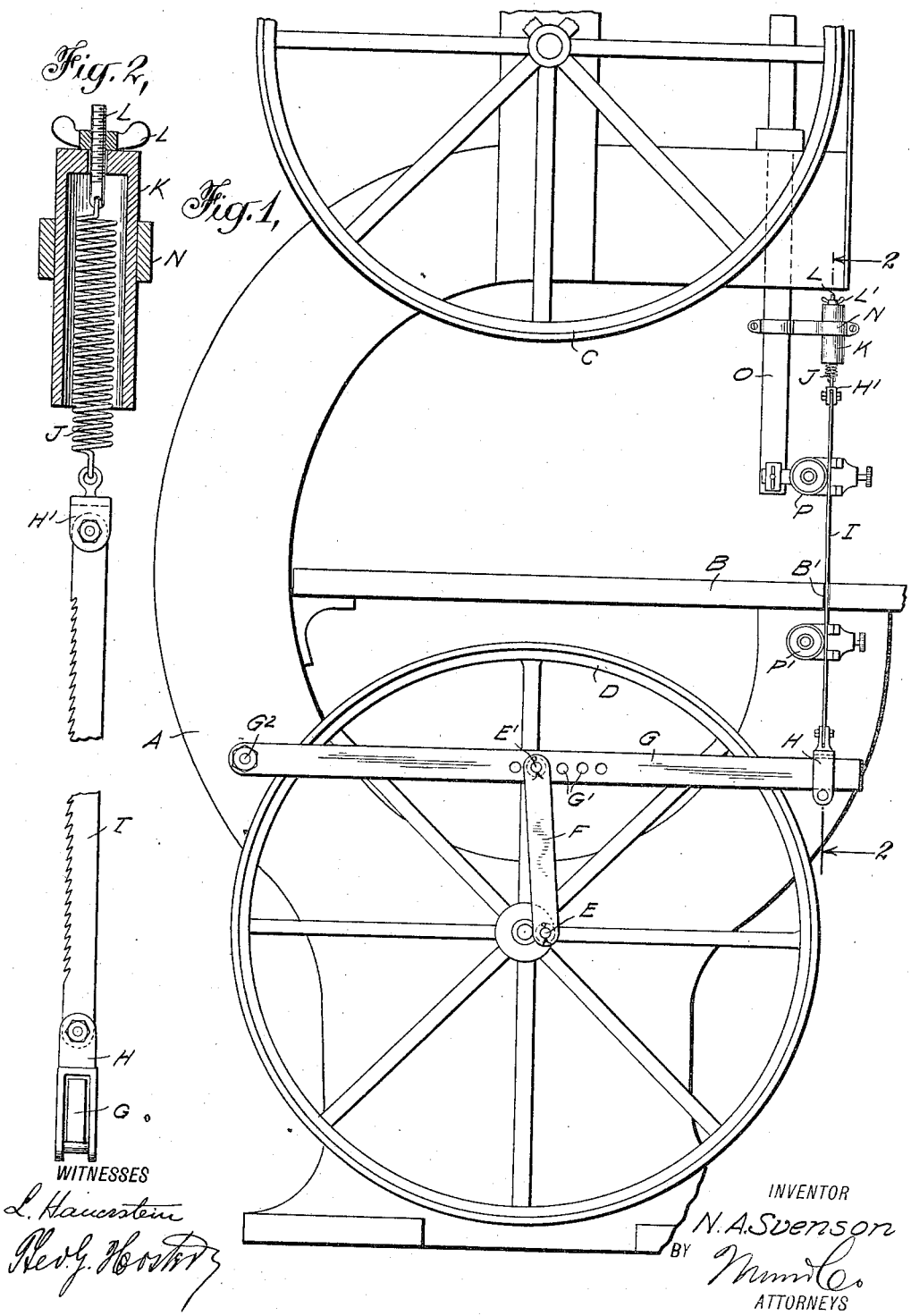

N. A. SVENSON.
CONVERTIBLE SAWING MACHINE.
APPLICATION FILED JULY 24, 1915.

1,181,694.

Patented May 2, 1916.

WITNESSES

INVENTOR
N. A. Svenson
BY
ATTORNEYS

UNITED STATES PATENT OFFICE.

NILS AUGUST SVENSON, OF YONKERS, NEW YORK.

CONVERTIBLE SAWING-MACHINE.

1,181,694.   Specification of Letters Patent.   Patented May 2, 1916.

Application filed July 24, 1915. Serial No. 41,718.

*To all whom it may concern:*

Be it known that I, NILS A. SVENSON, a citizen of the United States, and a resident of Wakefield Park, Yonkers, in the county of Westchester and State of New York, have invented a new and Improved Convertible Sawing-Machine, of which the following is a full, clear, and exact description.

The object of the invention is to provide a new and improved sawing machine which can be readily converted from a band saw to a jig saw and vice versa.

Another object is to provide an ordinary band saw with a simple and very effective jig saw attachment and without disturbing the general construction of the band saw.

In order to accomplish the desired result, use is made of a lever connected by a pitman with a crank pin on one of the revolving parts of the band saw, preferably the lower pulley, a saw holder at one end of the lever and to which one end of a jig saw blade is attached, and a spring mounted on the guide post of the band saw and connected with the other end of the jig saw blade.

A practical embodiment of the invention is represented in the accompanying drawings forming a part of this specification, in which similar characters of reference indicate corresponding parts in both views.

Figure 1 is a side elevation of the jig saw attachment as applied to an ordinary band saw from which the endless saw band has been removed; and Fig. 2 is an enlarged face view of the jig saw blade and its end connections.

The jig saw attachment is applied to an ordinary band saw mounted on a frame A supporting a table B and having the usual upper and lower pulleys C and D around which passes the endless saw band (not shown). A crank pin E is secured to the lower pulley D and is connected by a pitman F with a pivot pin E' engaging one of a series of apertures G' formed in a lever G, pivoted at its rear end at G² on the frame A. On the forward free end of the lever G is held a holder H on which is fastened the lower end of a jig saw blade I connected at its upper end with a holder H' held on the lower end of a spring J arranged within a spring casing K. The upper end of the spring J is attached to a tension screw L extending through the top of the casing K and engaged by a nut L' resting on the top of the said casing K. On turning the nut L' the screw L is raised or lowered according to the direction in which the nut L' is turned to adjust the tension of the spring J. The casing K is attached to a bracket N removably secured to the guide post O of the band saw, and which post carries the usual guide P for the saw band as well as for the jig saw blade I. A similar guide P' is arranged on the frame A below the table B for guiding both the band saw and the blade I according to whichever is used at the time.

It will be noticed that the jig saw attachment described can be readily applied to a band saw of usual construction and when so applied a reciprocating motion is given to the blade I by the lever G and the spring J on driving the lower pulley D. It is understood that the downward movement of the jig saw blade I is accomplished by the lever G, while the return movement is caused by the spring J, which latter is put under tension during the downward movement of the blade I. It is further understood that when the pulley D is running, an up and down swinging motion is given to the lever G by the pitman F connecting the lever G with the wrist pin E. The stroke of the jig saw blade I may be increased or diminished by engaging the pivot pin E' with an aperture G' farther from or nearer to the fulcrum G² of the lever G. The several parts of the jig saw attachment can be readily removed whenever it is desired to use the sawing machine as a band saw, it being understood that in this case the saw band is placed in position on the pulleys C and D after the parts of the attachment have been removed.

The jig saw attachment is very simple and durable in construction and composed of comparatively few parts, which can be readily placed in position on an ordinary band saw.

Having thus described my invention, I claim as new and desire to secure by Letters Patent:

1. The combination with a machine frame provided with a table and having upper and lower pulleys thereon, over which a band saw is adapted to pass, of a jig saw attachment, comprising a lever mounted at one end to swing on the machine frame, a link pivotally and adjustably connected with the said lever, a crank pin on the lower pulley and pivotally connected with the said link, a holder mounted on the free end of said lever and to which the lower end of a jig saw blade is connected, a holder for the upper end of said jig saw blade, the movement of the lever imparting a downward movement to the saw blade, means connected with the holder at the upper end of the saw blade for imparting a return movement to the saw blade, and guides for the saw blade carried by the machine frame above and below the said table.

2. The combination with a machine frame, and a pulley thereon, the frame having a guide post, of a jig saw attachment, comprising a lever pivoted at its rear end on the machine frame and provided with a series of longitudinally arranged apertures, a link provided with a pivot pin engaging one of said apertures, a crank pin on the said pulley and connected with said link, a holder mounted on the said lever and to which one end of a jig saw blade is attached, a holder connected with the other end of said saw blade, tension means supported from said guide post and connected with the upper end of said last mentioned holder, and guides for said saw blade carried by said guide post and the machine frame.

In testimony whereof I have signed my name to this specification in the presence of two subscribing witnesses.

NILS AUGUST SVENSON.

Witnesses:
 VAN CLUF BISHOP,
 EDNA LEVY.

Copies of this patent may be obtained for five cents each, by addressing the "Commissioner of Patents, Washington, D. C."